UNITED STATES PATENT OFFICE.

WILLIAM IHNC, OF MEDFORD, WISCONSIN.

PROCESS OF PRESERVING.

SPECIFICATION forming part of Letters Patent No. 328,223, dated October 13, 1885.

Application filed August 14, 1885. Serial No. 174,430. (No specimens.)

*To all whom it may concern:*

Be it known that I, WILLIAM IHNC, of Medford, in the county of Taylor and State of Wisconsin, have invented a new and Improved Process of Preserving Brewers' Grains, of which the following is a full, clear, and exact description.

It is well known that grains which are the residue of the malt used in breweries make a valuable feed for cows and other cattle. From their nature, however, they are subject to quick fermentation and destruction, and where they cannot be almost immediately disposed of, which often occurs in large breweries in cities, they are not unfrequently a great source of annoyance.

My invention has for its object the preservation of these grains, so as to make them available for feed for a long period of time without their becoming sour or spoiling; and the invention consists in a novel process for such purpose, substantially as hereinafter described.

Said grains—the residue of the malt—I first put into filtering-receptacles of any suitable kind—such, for instance, as coarse sacks, coops, or boxes having perforated bottoms and covered with coarse cloth—to free the grains by dripping from most of the water contained in them. After this is accomplished the grains are put into suitable vessels of wood, iron, stoneware, or other suitable material and treated, first, with a solution of common salt; then with a solution of dextrine, and afterward with a solution of permanganate of potassa. The quantities of these substances used must be determined by the condition of the grains, by the period of the year, and by the length of time for which it is desired to preserve the grains; but ordinarily a five per cent. solution of salt, a three per cent. solution of dextrine, and a two per cent. solution of permanganate of potassa will answer. After the grains have been thoroughly mixed with the above-named solutions the whole mass is put into a suitable filtering-receptacle—as, for instance, into sacks made either of felt or coarse cloth, or boxes having perforated bottoms covered with cloth or felt—and said mass pressed, either by steam, hydraulic, or other pressure, into cakes similar to oil-cakes or other compact masses of convenient size and shape. This makes a desirable form of putting up the grains; and grains preserved in the manner described will be preserved as sound feed for a long period of time, and will not sour even in the hottest summer weather, but will prove a valuable and good feed for cattle, in convenient form for transportation by rail or shipment over long distances.

I am aware that brewers' grains have heretofore been dried and pressed into cakes, and I therefore do not claim such invention.

Having thus described my invention, what I claim as new, and desire to secure by Letters Patent, is—

The within-described process of preserving brewers' grains—the residue of malt—which consists in first draining said grains to deprive them of surplus water, and then treating them successively with a solution of common salt, a solution of dextrine, and a solution of permanganate of potassa, and afterward placing the mass in filtering-receptacles and subjecting it to pressure to form cakes or compact masses of convenient size and shape, essentially as herein set forth.

WILLIAM IHNC.

Witnesses:
I. H. WHEELOCK,
E. L. URQUHART.